(12) United States Patent
Chou

(10) Patent No.: US 8,579,744 B2
(45) Date of Patent: Nov. 12, 2013

(54) PNEUMATIC INFLATION VALVE CORE FOR INFLATABLE SPORTS BALL

(75) Inventor: Keng-Hua Chou, Yilan County (TW)

(73) Assignee: Yu-Lin Chou, Luodong Township, Yilan County (TW)

( * ) Notice: Subject to any disclaimer, the term of this patent is extended or adjusted under 35 U.S.C. 154(b) by 247 days.

(21) Appl. No.: 12/876,144

(22) Filed: Sep. 5, 2010

(65) Prior Publication Data
US 2012/0058846 A1    Mar. 8, 2012

(51) Int. Cl.
A63B 41/00    (2006.01)
F16K 15/20    (2006.01)

(52) U.S. Cl.
USPC ............................. 473/611; 473/610; 137/223

(58) Field of Classification Search
USPC .......... 473/603–605, 609–611, 593; 137/223; 251/903
See application file for complete search history.

(56) References Cited

U.S. PATENT DOCUMENTS

| | | | | |
|---|---|---|---|---|
| 1,923,501 A | * | 8/1933 | Perry | 473/611 |
| 1,974,378 A | * | 9/1934 | Nicoll | 473/611 |
| 1,990,374 A | * | 2/1935 | Goldsmith | 137/223 |
| 1,992,764 A | * | 2/1935 | Perry | 473/610 |
| 2,085,369 A | * | 6/1937 | Kilborn | 473/610 |
| 2,134,634 A | * | 10/1938 | Goldsmith | 473/611 |
| 2,151,466 A | * | 3/1939 | Eken | 473/611 |
| 2,183,900 A | * | 12/1939 | Voit et al. | 137/223 |
| 2,288,889 A | * | 7/1942 | Costello | 473/611 |
| 2,318,115 A | * | 5/1943 | Tubbs | 473/611 |
| 2,662,771 A | * | 12/1953 | Crowley | 473/610 |
| 2,710,623 A | * | 6/1955 | Kolos | 137/223 |
| 3,100,498 A | * | 8/1963 | Gibson, Jr. | 473/611 |
| 3,343,561 A | * | 9/1967 | Bowerman | 473/610 |
| 3,410,299 A | * | 11/1968 | Whittington | 137/223 |
| 4,320,776 A | * | 3/1982 | Yang | 473/610 |
| 5,033,498 A | * | 7/1991 | Brandt | 137/223 |
| 5,915,407 A | * | 6/1999 | West | 137/223 |
| 7,517,294 B2 | * | 4/2009 | Tsai | 473/610 |
| 2010/0167851 A1 | * | 7/2010 | Burke | 473/610 |

* cited by examiner

Primary Examiner — Steven Wong
(74) Attorney, Agent, or Firm — patenttm.us

(57) ABSTRACT

An inflatable sports ball and its pneumatic inflation valve core are provided. The pneumatic inflation valve core includes a passage penetrating the pneumatic inflation valve core in a lengthwise direction. The passage is provided for receiving an inflation needle which is served for inflating a ball bladder of an inflatable sports ball. When an inflation needle inserts into the passage of the pneumatic inflation valve core, since the pneumatic inflation valve core has adequate length, the pneumatic inflation valve core prevents the inflation needle from piercing through the ball bladder as the ball bladder is flat.

13 Claims, 8 Drawing Sheets

PNEUMATIC INFLATION VALVE CORE FOR INFLATABLE SPORTS BALL

BACKGROUND

1. Technical Field

The disclosure relates to a sports ball, more particularly to a pneumatic inflation valve core for inflatable sports ball.

2. Description of Traditional Technique

Conventional inflatable sports balls such as basketballs, American footballs, rugby balls, soccer balls (footballs), volleyballs and playground balls normally include below main parts: an exterior cover (e.g. outer leather), a ball bladder, a pneumatic inflation valve core and a valve housing. The ball bladder is in the exterior cover, and the valve housing is set on the inner surface of the ball bladder, and the pneumatic inflation valve core is inserted and fixed in the cavity of the valve housing.

When a user intends to inflate an inflatable sports ball as the ball bladder of inflatable sports ball is flat, the user inserts an inflation needle into the ball bladder via the pneumatic inflation valve core, and pressurizes a certain volume of air into the ball bladder until the ball bladder is filled with air to a sufficient pressure.

However, there are two main shortages for the conventional pneumatic valve core design. First of all, the most common issue, when a user intends to inflate the inflatable sports ball as the ball bladder of the inflatable sports ball is flat and the inner surface of the ball bladder is nearly contacted to the pneumatic inflation valve core, the user might be hasty to pierce through the ball bladder to damage the ball bladder with the inflation needle; the conventional pneumatic valve core has a short passage design penetrating the conventional pneumatic valve core.

Secondly, considering that a sports ball is played on the ground, the dirt has a chance to enter the canal. When the user again tries to re-pressurize the ball with the inflation needle, the dirt is going to be carried into the following slit of the valve. This will then cause air-leakage problem from the valve.

SUMMARY OF INVENTION

One of the purposes of the present disclosure is to provide a pneumatic inflation valve core for an inflatable sports ball in order to increase the durability of the inflatable sports ball.

The other purpose of the present disclosure is to provide a pneumatic inflation valve core for inflatable sports ball in order to totally contain an inflation needle in the pneumatic inflation valve core in inflating process, so as to further prevent the inflation needle from piercing through the ball bladder of the inflatable sports ball when the inflatable sports ball is flat.

Another purpose of the present disclosure is to provide a pneumatic inflation valve core design in order to obstruct the process of an inflation needle being inserted into the pneumatic inflation valve core, so as to further prevent the inflation needle from piercing through a ball bladder of the inflatable sports ball when the inflatable sports ball is flat.

Another purpose of the present disclosure is to provide a pneumatic inflation valve core for cutting down the reclaim rate of inflatable sports ball products and improving satisfaction of the end users.

The construction of this disclosure for achieving the aforementioned purposes is to provide a pneumatic inflation valve core design for inflatable sports ball.

The inflatable sports ball includes an exterior cover, a ball bladder, a valve housing and a pneumatic inflation valve core. The ball bladder is under the exterior cover, and has an opening thereon. The valve housing is arranged on the inner surface of the ball bladder and corresponds to the opening thereof. The pneumatic inflation valve core is inserted and fixed in the valve housing, includes a lengthwise body, a mouth, a crown and a sheath. The lengthwise body has a passage penetrating the lengthwise body in a lengthwise direction. The mouth is on one end of the lengthwise body and the distal surface of the mouth is exposed on the exterior cover. The sheath is on the other end of the lengthwise body opposite to the mouth, and extends outwards the valve housing thereof in the ball bladder. The crown is between the mouth and the sheath, and is finally fixed in the valve housing. When the passage of the pneumatic inflation valve core is inserted by an inflation needle, the sheath is served for preventing the inflation needle from piercing through the ball bladder as the ball bladder is flat.

In one embodiment of the present disclosure, the passage has a length thereof not smaller than the length of the inflation needle.

In the other embodiment of the present disclosure, the section of the passage in the mouth and the crown is shut as in a slit construction, and another section of the passage in the sheath is open as a canal construction.

Base on the embodiment, one optional feature discloses the diameter of the canal to be constantly narrowing down to equal or smaller than the diameter of the inflation needle.

Base on the embodiment, another optional feature discloses the inner surface of the sheath surrounding the canal gradually inclines to the centerline of the canal according to the direction from the crown towards the center of the ball bladder, and the diameter of one section of the canal is smaller than the diameter of the inflation needle.

Base on the embodiment, the other optional feature discloses the lengthwise length of the passage is long enough so that the inner surface of the sheath applies friction upon the inflation needle being inserted. Particularly, the inner surface of the sheath obstructs the movement of the inserting inflation needle and absorbs the force that the inflation needle inserts into the pneumatic inflation valve core.

The inner surface of the sheath surrounding the canal slows down the movement of the inflation needle as it enters the pneumatic inflation valve core. It can prevent the inflation needle from easily piercing through the ball bladder. In most cases, the sheath can contain the entire inflation needle therein. In few other cases, the sheath can minimize the length of the inflation needle extending outwards the valve core inside the bladder.

In another embodiment of the present disclosure, the passage also includes an indentation formed on the distal surface of the mouth, and the indentation is in a round-shape and linked with the slit. Furthermore, the diameter of the indentation is substantially the same as the diameter of the inflation needle.

Thus, there are two functions for the indentation. First of all, when a user intends to insert an inflation needle into the pneumatic inflation valve core, the indentation helps to guide the inflation needle to point at the slit more accurately. Secondly, the depth of the indentation is controlled and forms a shallow round shape. Thus, when the sports balls are played on the ground, dirt is unlikely to be stuck in the indentation. Even a small amount of dirt sticks to the surface of the indentation, it can be easily noticed & removed by the player. It therefore prevents the dirt from entering the slit together with the inflation needle.

In another embodiment of the present disclosure, the pneumatic inflation valve core is made of such materials as natural rubber, butyl rubber or synthetic rubber.

The ball bladder will no longer be pierced through when the inflatable sports ball is pressurized and inflated from a deflated state. Thus, the disclosure can help to cut down the reclaim rate of inflatable sports ball products and improve its durability, which can also raise the satisfaction of the end user.

DESCRIPTION OF THE PREFERRED EMBODIMENTS

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
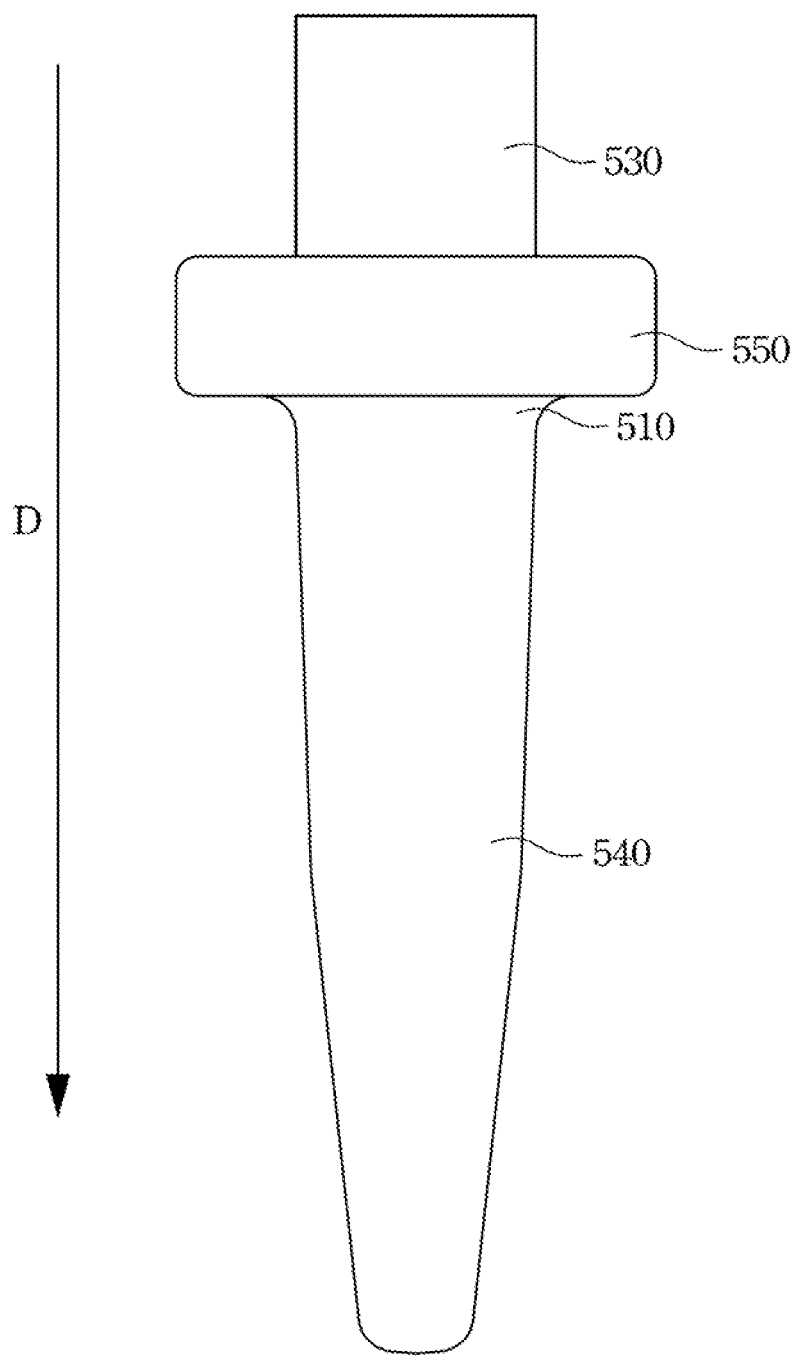
FIG. 1A is the front view of a pneumatic inflation valve core of the present disclosure.
Figure 1B:
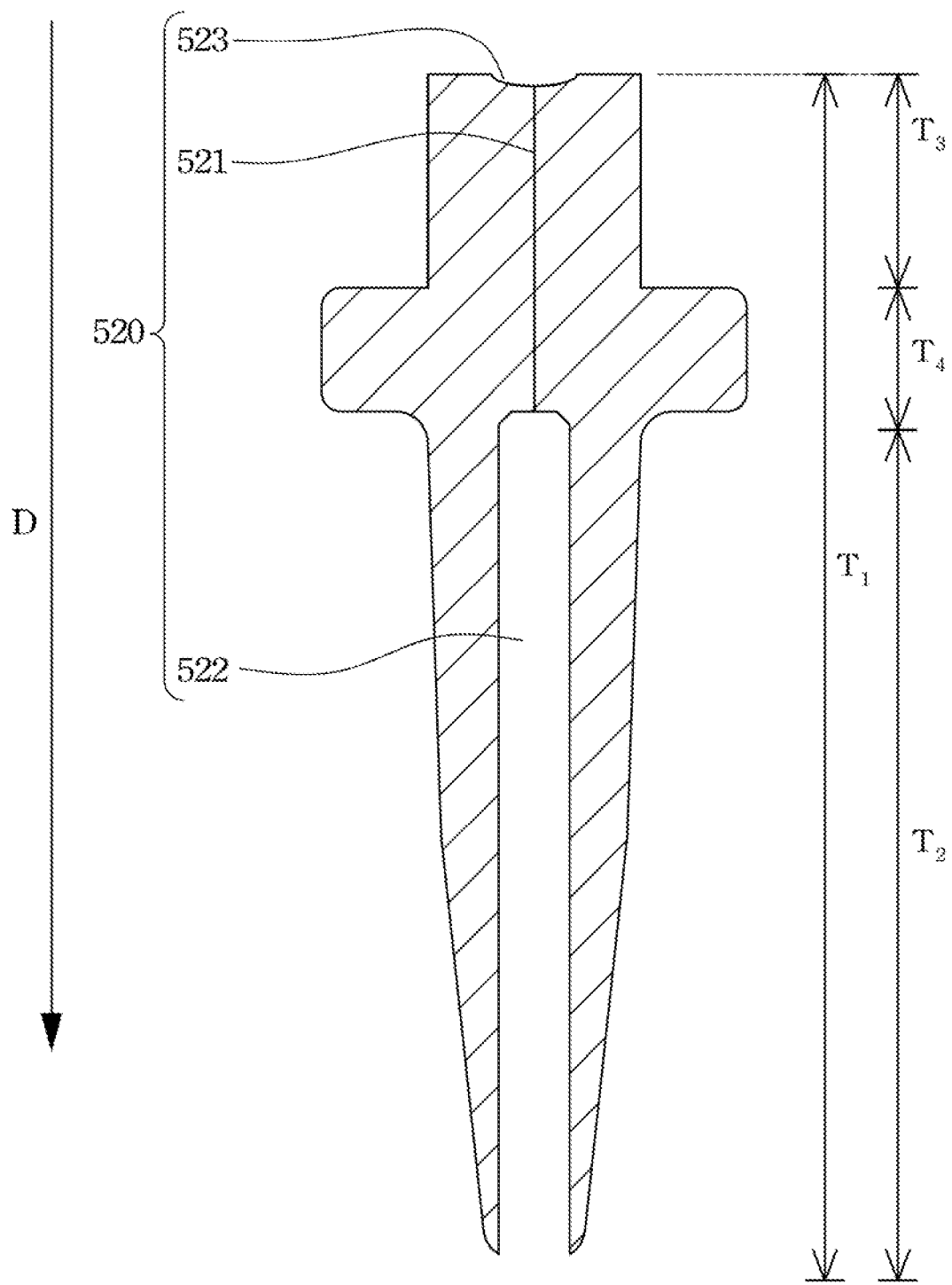
FIG. 1B is the cross sectional view of FIG. 1A along the lengthwise direction D of the pneumatic inflation valve core according to one of the embodiments.
Figure 2:
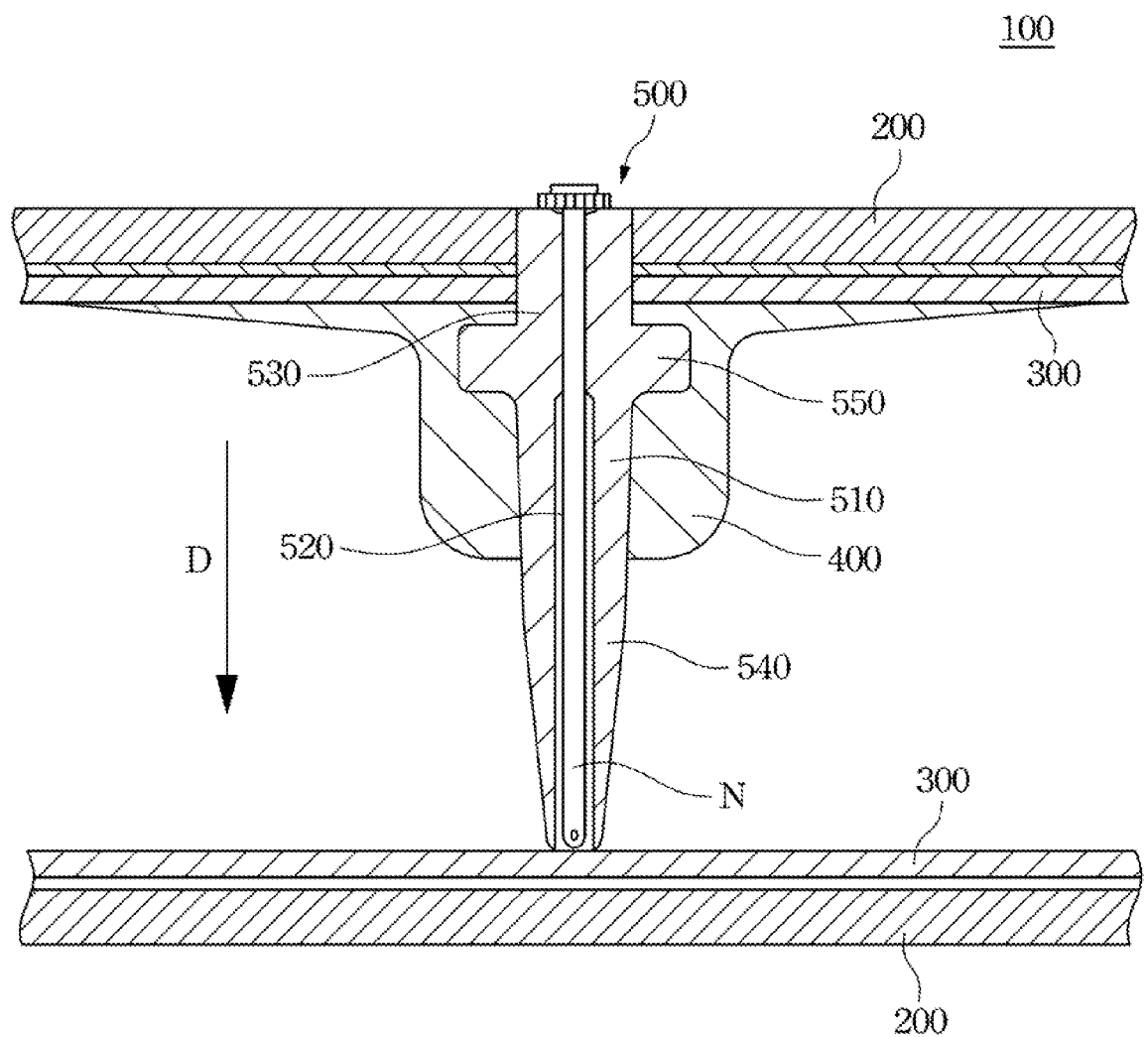
FIG. 2 is the cross sectional view of a part of an inflatable sports ball of the present disclosure according to the embodiment in FIG. 1B as the inflatable sports ball is flat.

FIG. 1A, FIG. 1B and FIG. 2. FIG. 1A is a front view of a pneumatic inflation valve core 500 of the present disclosure according to one of the embodiments. FIG. 1B is a cross sectional view of FIG. 1A along a lengthwise direction D of the pneumatic inflation valve core 500. FIG. 2 is a cross sectional view of a part of an inflatable sports ball 100 of the present disclosure according to the embodiment as the inflatable sports ball 100 is flat.

The present disclosure is to disclose an inflatable sports ball 100 and its pneumatic inflation valve core 500. The inflatable sports ball 100 at least includes an exterior cover 200, a ball bladder 300, a valve housing 400 and a pneumatic inflation valve core 500. The exterior cover 200 totally covers the outer surface of the ball bladder 300; thus, the ball bladder 300 is set beneath the exterior cover 200. Both the exterior cover 200 and the ball bladder 300 have openings that align with each other.

The valve housing 400 is arranged on the inner surface of the ball bladder 300 and corresponds to the openings thereof. Specifically, the valve housing 400 has a cavity therein (FIG. 2). The cavity penetrates the valve housing 400 in a direction D for receiving the pneumatic inflation valve core 500 (FIG. 2).

The pneumatic inflation valve core 500 is inserted and fixed in the valve housing 400, and extends outwards the valve housing 400 inside the ball bladder 300 with one end thereof. The pneumatic inflation valve core 500 is penetrated through along its lengthwise direction D by a passage 520 for receiving an inflation needle N when inflating.

In one embodiment of the present disclosure, the pneumatic inflation valve core 500 is formed into a lengthwise body 510 as a tube shape, and is penetrated through by the passage 520. The pneumatic inflation valve core 500 is inserted and fixed in the cavity of the valve housing 400. The lengthwise body 510 has a mouth 530, a crown 550 and a sheath 540 in order. The mouth 530 is on one end of the lengthwise body 510, and the distal surface of the mouth 530 is exposed on the exterior cover 200 from the valve housing 400.

The sheath 540 is on the other end of the lengthwise body 510 which is opposite to the mouth 530, and extends outwards the valve housing 400 inside the ball bladder 300. The crown 550 is between the mouth 530 and the sheath 540, and is normally shaped as an annular ring revolving around the lengthwise body 510, and is finally fixed in the valve housing 400. Because of the crown 550, the pneumatic inflation valve core 500 can be held in the valve housing 400.

Furthermore, in another embodiment of the present disclosure, the passage 520 includes two sections. One section of the passage 520 in the mouth 530 and crown 550 is shut by the lengthwise body 510 as a slit 521. The other section of the passage 520 in the sheath 540 is opened as a canal 522. The width of the slit 521 is narrower than the width of the canal 522. Thus, when the inflatable sports ball 100 is played, because the slit 521 is shut, dirt is not easy to permeate into the passage 520 via the slit 521. Therefore, the dirt will not be further carried into the passage 520 by the inflation needle N when re-pressurizing the inflatable sports ball 100, so as to minimize air-leakage causes.

In addition, in another embodiment of the present disclosure, the passage 520 also includes an indentation 523. The indentation 523 is preferred in a round shape, and formed on the distal surface of the mouth 530 exposed on the inflatable sports ball 100 and connected with the slit 521 of the passage 520.

Furthermore, the diameter of the indentation 523 can be substantially similar to or the same as the diameter of the inflation needle N. Thus, when a user intends to insert an inflation needle N into the pneumatic inflation valve core 500, the indentation 523 helps to guide the inflation needle N to point at the slit 521 more accurately. Secondly, the depth of the indentation is controlled and forms a shallow round shape. Thus, when the sports balls 100 are played on the ground, dirt is unlikely to be stuck in the indentation 523. Even a small amount of dirt sticks on the surface of the indentation 523, it can be easily noticed & removed by users. It therefore prevents the dirt entering the slit 521 together with the inflation needle N.

The diameter of the inflation needle N can be defined in a range of 1.5 mm to 2.5 mm. Thus, the diameter of the indentation 523 in the embodiment can be substantially similar to or the same as the range of 1.5 mm to 2.5 mm.

In another embodiment of the present disclosure, as an option of raw material for the pneumatic inflation valve core 500, the pneumatic inflation valve core 500 can be produced with natural rubber. Other options may be composite material of latex, butyl rubber or synthetic rubber.

Since the issue mentioned above that the flat ball bladder could be pierced through by the inflation needle N still exists, after repeated searches and observations, the inventor of the disclosure finds the following facts. The inventor of the disclosure finds that the inner surface of the pneumatic inflation valve core 500 surrounding the passage 520 with a longer length can provide much more resistance on obstructing the movement of the inflation needle N when the inflation needle N is inserted into the pneumatic inflation valve core 500.

Thus, because users may have trouble controlling the force of inserting the inflation needle into the pneumatic inflation valve core to pierce through the ball bladder when inserting into the conventional pneumatic inflation valve core with an inflation needle N, increasing the length of the pneumatic inflation valve core can be a solution of the disclosure to decrease the possibility of piercing through the ball bladder. Therefore, the total length of the pneumatic inflation valve core 500 should be greater than a length of the conventional one (e.g. 18 mm) and smaller than the diameter of the ball bladder 300.

Referring to FIG. 1B and FIG. 2 again, since the total length of the pneumatic inflation valve core 500 can be seen as the lengthwise length T1 of the passage 520, in one embodiment of the disclosure, the lengthwise length T1 of the passage 520 is greater than the lengthwise length of the inflation needle N or equal to the lengthwise length of the inflation needle N. When the inflation needle N is inserted into the passage 520 of the pneumatic inflation valve core 500, because the passage 520 can contain the entire inflation needle N therein, so the inflation needle fails to extend outwards the pneumatic inflation valve core 500 so as to prevent the inflation needle puncturing through the ball bladder 300 when the ball bladder 300 is flat and in a deflated state.

For example, if the length of the inflation needle N is defined in a range of 24 mm to 38 mm, thus, the lengthwise length T1 of the passage 520 in the embodiment should be at least in the range of 24 mm to 38 mm; otherwise, the lengthwise length T1 of the passage 520 in the embodiment can be greater than the lengthwise length of the inflation needle N around 24 mm to 38 mm.

Noted that the lengthwise length of the inflation needle N is defined that a total length of the inflation needle N which completely inserts into the passage 520.

Figure 3A:
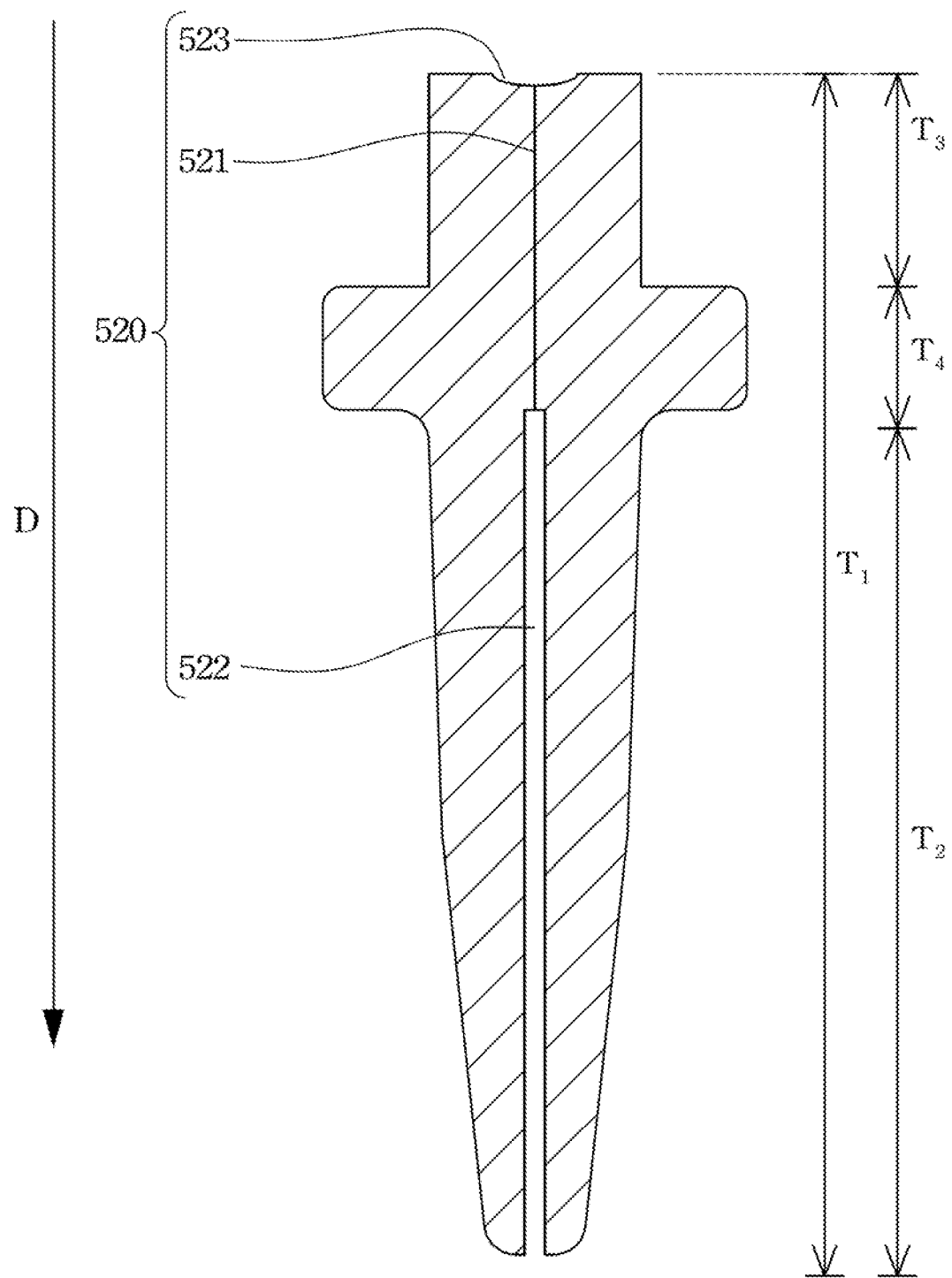
FIG. 3A is the cross sectional view of FIG. 1A along the lengthwise direction D of the pneumatic inflation valve core according to another one of the embodiments.
Figure 3B:
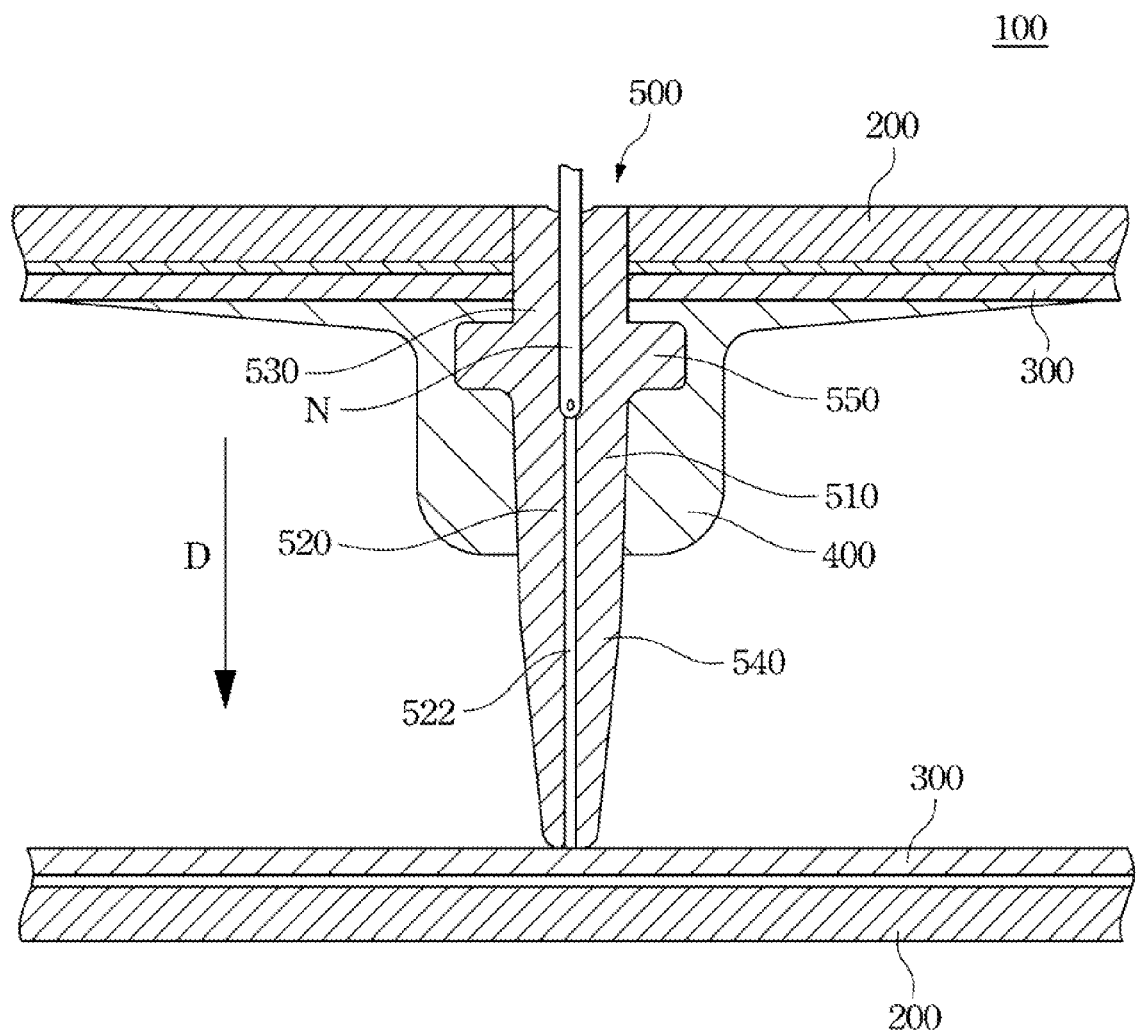
FIG. 3B is the cross sectional view of a part of an inflatable sports ball of the present disclosure according to the embodiment in FIG. 3A as the inflatable sports ball is flat.

Referring to FIG. 3A and FIG. 3B, FIG. 3A is the cross sectional view of FIG. 1A along the lengthwise direction D of the pneumatic inflation valve core according to another one of the embodiments, and FIG. 3B is the cross sectional view of a part of an inflatable sports ball of the present disclosure according to the embodiment in FIG. 3A as the inflatable sports ball is flat.

In another embodiment of the disclosure, the diameter of the canal 522 is constantly smaller than the diameter of the inflation needle N. Thus, when the inflation needle N is inserted into the canal 522 of the passage 520 after going through the slit 521 of the passage 520, due to the narrower canal 522, the inner surface of the sheath 540 touches the inflation needle N so that the inner surface of the sheath 540 will absorb the force that the inflation needle N inserts into the pneumatic inflation valve core 500, and obstruct the movement of the inserting inflation needle N, so as to prevent puncturing through the ball bladder 300 or the exterior cover 200 when the ball bladder 300 is flat and in a deflated state.

For example, if the diameter of the inflation needle N can be defined in a range of 1.5 mm to 2.5 mm, thus, the diameter of the canal 522 in the embodiment can be constantly narrow down to equal or smaller than the diameter of the inflation needle N as in the range of 1.5 mm to 2.5 mm.

Figure 4A:
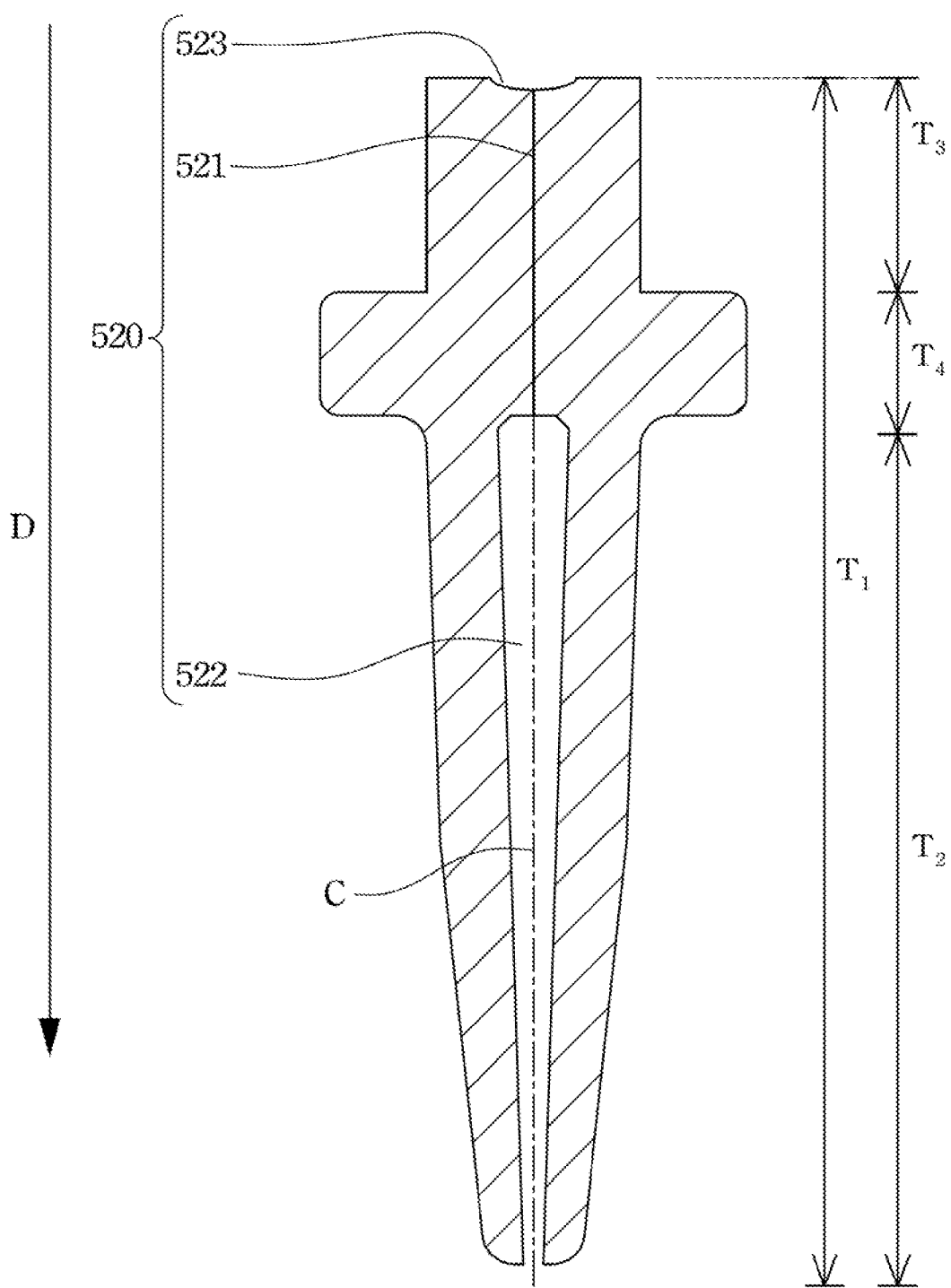
FIG. 4A is the cross sectional view of FIG. 1A along the lengthwise direction D of the pneumatic inflation valve core according to the other one of the embodiments.
Figure 4B:
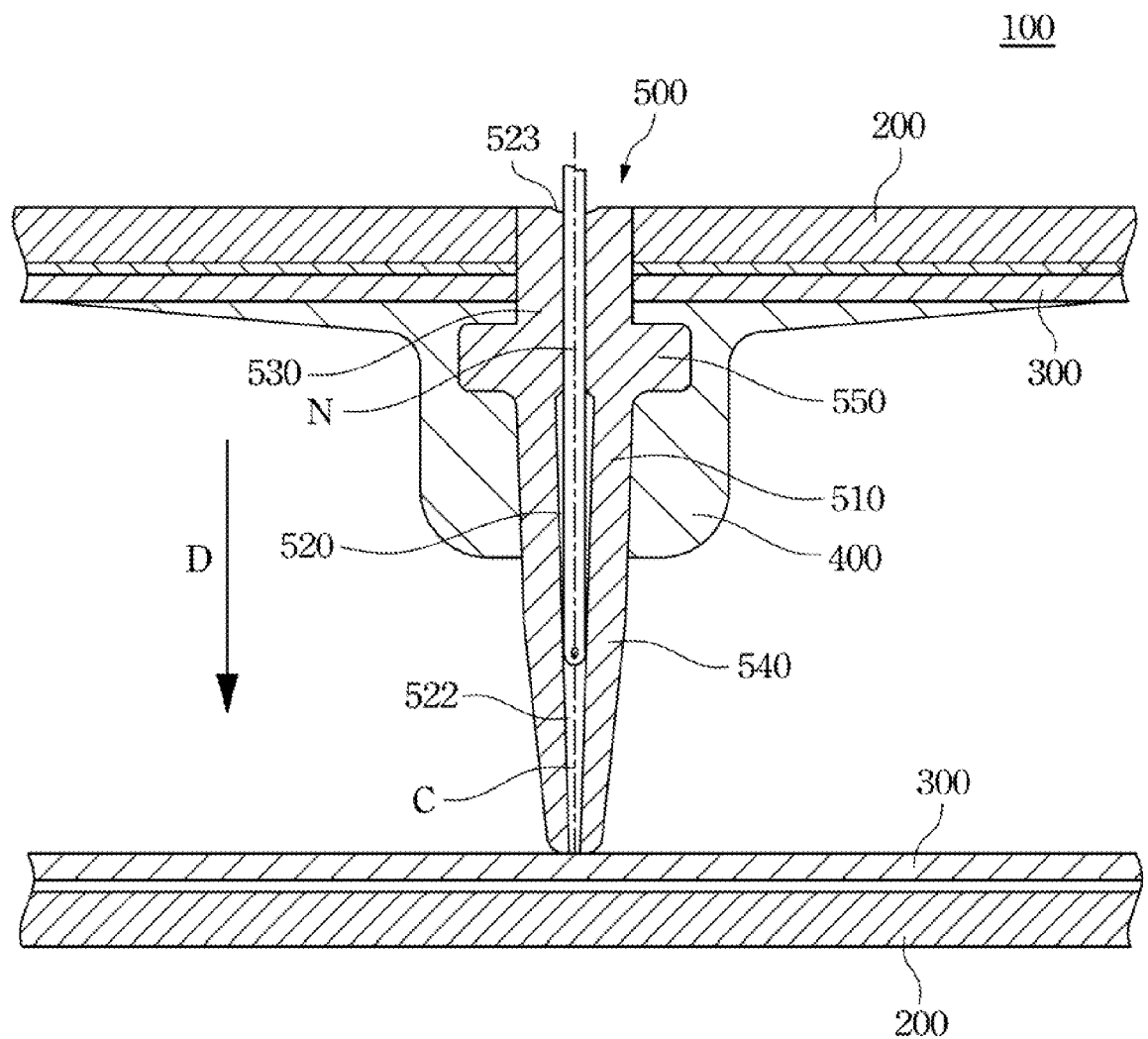
FIG. 4B is the cross sectional view of a part of an inflatable sports ball of the present disclosure according to the embodiment in FIG. 4A as the inflatable sports ball is flat.

Referring to FIG. 4A and FIG. 4B, FIG. 4A is the cross sectional view of FIG. 1A along the lengthwise direction D of the pneumatic inflation valve core according to the other one of the embodiments, and FIG. 4B is the cross sectional view of a part of an inflatable sports ball of the present disclosure according to the embodiment in FIG. 4A as the inflatable sports ball is flat.

In the embodiment of the disclosure, the inner surface of the sheath 540 gradually inclines towards the centerline C of the canal 522 along the direction D from the crown 550 towards the center of the ball bladder 300; namely, the canal 522 is getting narrow gradually towards the center of the ball bladder 300. One section of the canal 522 has a diameter smaller than that of the inflation needle N. The other section of the canal 522 closing to the slit 521 has a diameter which can be greater or equal to that of the inflation needle N.

When the inflation needle N is inserted into the canal 522 of the passage 520 after through the slit 521 of the passage 520, the inflation needle N finally touches the inclined inner surface of the sheath 540 such that the sheath 540 of the pneumatic inflation valve core 500 will obstruct the movement of the inserting inflation needle N and absorb the force that the inflation needle N inserts into the pneumatic inflation valve core 500. Thus, it prevents from puncturing through the ball bladder 300 or the exterior cover 200 when the ball bladder 300 is flat and in a deflated state.

Figure 5:
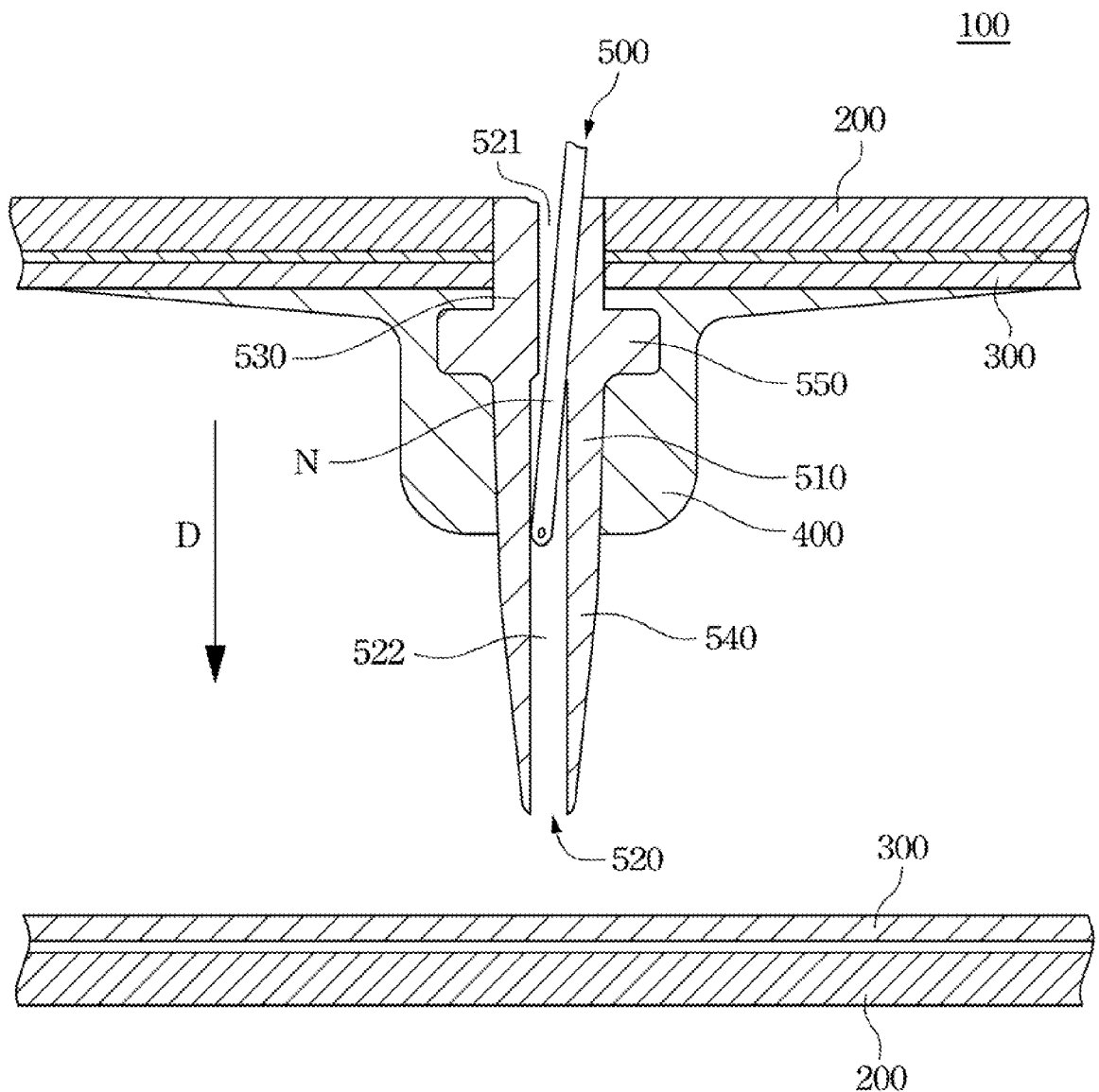
FIG. 5 is the cross sectional view of a part of an inflatable sports ball of the present disclosure according to one of the other embodiments as the inflation needle inserted improperly.

Referring to FIG. 1B and FIG. 5. FIG. 5 is the cross sectional view of a part of an inflatable sports ball of the present disclosure according to one of the other embodiments as the inflation needle inserted improperly.

In the embodiment of the disclosure, the lengthwise length T1 of the passage 520 does not have to be greater than the lengthwise length of the inflation needle N as long as the lengthwise length T1 of the passage 520 is long enough such that when a user is misled to insert the inflation needle N into the pneumatic inflation valve core 500 improperly, the inner surface of the sheath 540 acts as a shield to guide the inflation needle N back to the correct direction, and provides enough resistance to obstruct the movement of the inserting inflation needle N and absorb the force that the inflation needle N inserts into the pneumatic inflation valve core 500 when the user intends to inflate the inflatable sports ball with the inflation needle N. Therefore, it further prevents the inflation needle N from easily piercing through the ball bladder 300 to damage the ball bladder 300 when the ball bladder 300 is flat and the inner surface of the ball bladder 300 is nearly contacted to the sheath 540.

In the embodiment, the lengthwise length T1, for example, can be designed in a range between 20 mm to 28 mm. Also, the lengthwise length T1 can be designed in a preferred range of 28 mm to 40 mm. Furthermore, the lengthwise length T1 in another option can be designed in a range between 20 mm to 40 mm.

The lengthwise length T2 of the sheath 540, the lengthwise length T3 of the mouth 530, and the lengthwise length T4 of the crown 550 can be respectively altered according to the manufacturer's demand. Furthermore, the weight of the pneumatic inflation valve core 500, regardless of its length, should be similar to or even equal to the weight of the conventional one (0.9 g to 1.3 g).

Thus, when the pneumatic inflation valve core is installed in the inflatable sports ball, the weight of the pneumatic inflation valve core does not influence the balance of the inflatable sports ball. Therefore, the inflatable sports ball can provide good performance as usual.

Finally, the inflatable sports ball and its pneumatic inflation valve core provided in the present disclosure can prevent the inflation needle from puncturing through the ball bladder, when the ball bladder is being pressurized and inflated from a deflated state. Thus, the disclosure cuts down the reclaim rate of inflatable sports ball products and raises the consumers' satisfaction.

The reader's attention is directed to all papers and documents which are filed concurrently with his specification which are open to public inspection with this specification, and the contents of all such papers and documents are incorporated herein by reference. All the features disclosed in this specification (including any accompanying claims, abstract, and drawings) may be replaced by alternative features serving the same, equivalent or similar purposes, unless expressively stated otherwise. Thus, unless expressively stated otherwise, each feature disclosed is one example only of a generic series of equivalent or similar features.

What is claimed is:

1. A pneumatic inflation valve core of an inflatable sports ball, which includes an exterior cover, a ball bladder disposed in the exterior cover, and a valve housing arranged on an inner surface of the ball bladder for fixing the pneumatic inflation valve core therein, the pneumatic inflation valve core comprising:
   a lengthwise body having a passage penetrating the lengthwise body in a lengthwise direction;
   a mouth disposed on one end of the lengthwise body and a distal surface of the mouth exposed on the exterior cover;
   a sheath disposed on the other end of the lengthwise body opposite to the mouth, and extending outwards the valve housing in the ball bladder; and
   a crown disposed between the mouth and the sheath, and served for being fixed in the valve housing,
   wherein an outermost section of the passage in the mouth and the crown is shut as a shut slit, and one end of the shut slit is exposed outwards the distal surface of the mouth, and the other end of the shut slit in the valve housing is tightened by the valve housing, an innermost section of the passage in the sheath is opened as a canal, the canal directly links to the shut slit, and a diameter of the canal is smaller than a diameter of an inflation needle;
   an inner surface of the sheath surrounding the canal gradually inclines to the centerline of the canal in a direction from the crown towards the center of the ball bladder, and an end of the canal opposite to the crown is still opened; and
   when the inflation needle is inserted into the passage of the pneumatic inflation valve core, the pneumatic inflation valve core has adequate length such that the sheath prevents the inflation needle from piercing through the ball bladder when the ball bladder is flat.

2. The pneumatic inflation valve core according to claim 1, wherein the passage has a lengthwise length not smaller than a length of the inflation needle.

3. The pneumatic inflation valve core according to claim 2, wherein the lengthwise length of the passage is in a range of 24 mm to 38 mm.

4. The pneumatic inflation valve core according to claim 2, wherein the lengthwise length of the passage is greater than the length of the inflation needle and smaller than a diameter of the ball bladder.

5. The pneumatic inflation valve core according to claim 1, wherein a lengthwise length of the passage is long enough thereby the inner surface of the sheath resists the inserting inflation needle to obstruct the movement of the inserting inflation needle and to absorb the force by which the inflation needle is inserted into the pneumatic inflation valve core.

6. The pneumatic inflation valve core according to claim 5, wherein the lengthwise length of the passage is in a range of 20 mm to 40 mm.

7. The pneumatic inflation valve core according to claim 1, wherein the passage further has an indentation formed on the distal surface of the mouth, and the indentation is connected with the slit.

8. The pneumatic inflation valve core according to claim 7, wherein a diameter of the indentation is substantially the same as the diameter of the inflation needle.

9. An inflatable sports ball, comprising:
   an exterior cover having an opening thereon;
   a ball bladder disposed in the exterior cover, and having an opening thereon aligned to the opening of the exterior cover;
   a valve housing arranged on an inner surface of the ball bladder, corresponding to the opening of the ball bladder, and having a cavity penetrated through the valve housing;
   an pneumatic inflation valve core inserted and fixed in the cavity, having a passage penetrating through the pneumatic inflation valve core in a lengthwise direction for receiving an inflation needle, the pneumatic inflation valve core further comprising:
      a mouth disposed on one end of the pneumatic inflation valve core and a distal surface of the mouth is exposed on the exterior cover;
      a sheath disposed on the other end of the pneumatic inflation valve core opposite to the mouth thereof, and extending outwards the valve housing in the ball bladder; and
      a crown disposed on the pneumatic inflation valve core between the mouth and the sheath, and fixed in the cavity of the valve housing,
      wherein an outermost section of the passage in the mouth and the crown is shut as a shut slit, and one end of the shut slit is exposed outwards the distal surface of the mouth, the other end of the shut slit in the valve housing is tightened by the valve housing, and an innermost section of the passage in the sheath is opened as a canal, the canal directly links with the slit, and a diameter of the canal is smaller than a diameter of the inflation needle; and
      an inner surface of the sheath surrounding the canal gradually inclines to the centerline of the canal in a direction from the crown towards the center of the ball bladder, and an end of the canal opposite to the crown is still opened;
      whereby when the inflation needle is inserted into the passage of the pneumatic inflation valve core, the pneumatic inflation valve core has adequate length so as to prevent the inflation needle from piercing through the ball bladder when the ball bladder is flat.

10. The inflatable sports ball according to claim 9, wherein the passage has a lengthwise length not smaller than a length of the inflation needle.

11. The inflatable sports ball according to claim 10, wherein the lengthwise length of the passage is not smaller than the length of the inflation needle defined in a range of 24 mm to 38 mm.

12. The inflatable sports ball according to claim 9, wherein a lengthwise length of the passage is in a range of 20 mm to 40 mm thereby the inner surface of the sheath surrounding the canal resists the inserting inflation needle to obstruct the movement of the inserting inflation needle and to absorb the force by which the inflation needle is inserted into the pneumatic inflation valve core.

13. The inflatable sports ball according to claim 9, wherein the passage further has an indentation formed on the distal surface of the mouth, and the indentation is linked with the slit, and a diameter of the indentation is substantially the same as the diameter of the inflation needle.

\* \* \* \* \*